May 13, 1930.  W. REILLY  1,758,675
AUTOMATIC FISH SCALER
Filed April 2, 1926
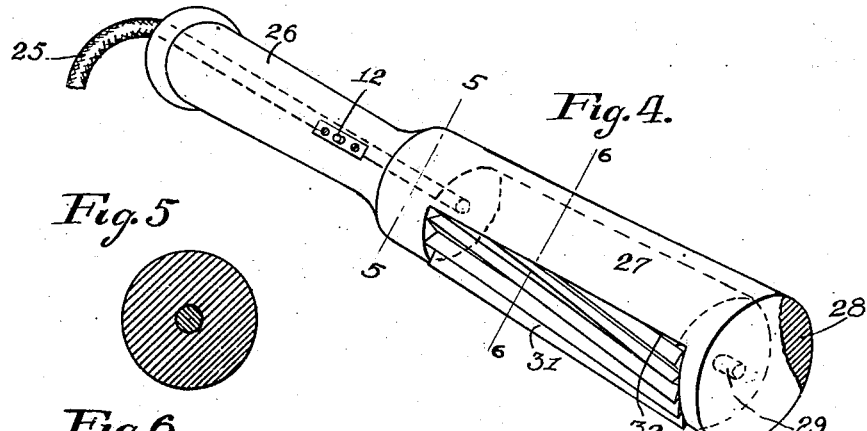
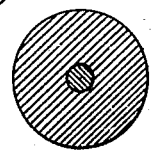
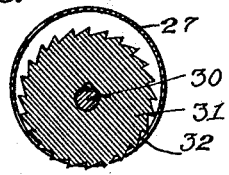
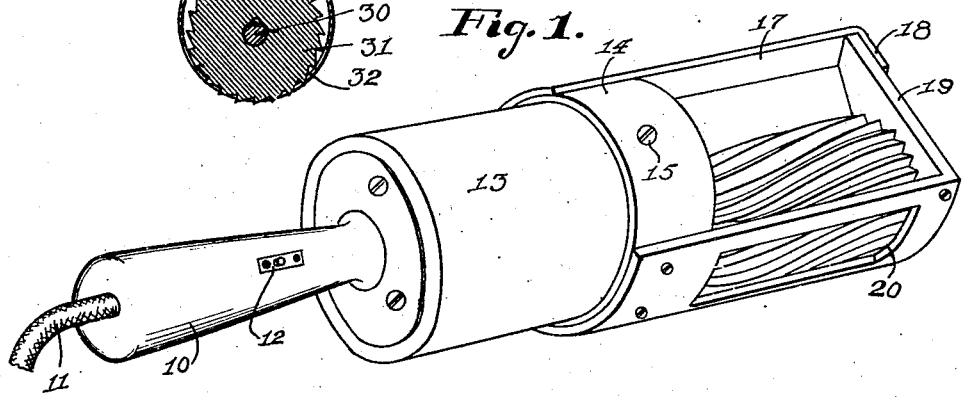
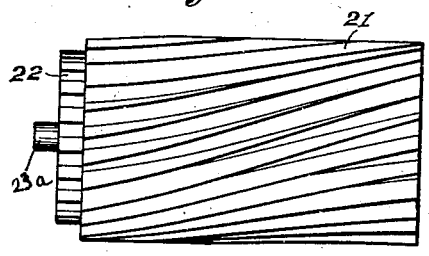
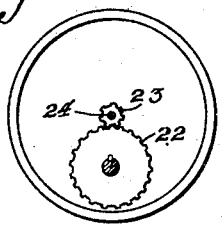
INVENTOR.
William Reilly Patented May 13, 1930

1,758,675

UNITED STATES PATENT OFFICE

WILLIAM REILLY, OF WHITE PLAINS, NEW YORK

AUTOMATIC FISH SCALER

Application filed April 2, 1926. Serial No. 99,225.

This invention relates to improvements in fish scaling apparatus and has for its object to provide a simple, efficient and inexpensive device of this character.

One of the objects of my invention is to provide a form of fish scaler wherein use is made of a milling cutter designed to rapidly scale fish and to quickly overcome the resistance of unruly scales of some fish.

Another object of the said invention is to provide another form of fish scaler adapted to automatically scale fish wherein a distant motor is employed having a flexible shaft extending to where the fish scaler proper is located.

A still further object of the present invention is to provide, in an automatic fish scaler, means for resisting the coarser scales of fish at the time said scales are engaged by a cutter, in order to prevent backlash on the motor as far as possible.

Another object of my invention is to provide means for controlling the speed of the cutting scalers; for reducing the weight of the automatic fish scaler to make it as light as possible; and to provide for the free disposal of the fish scales removed from the fish without unnecessarily clogging the moving parts of the machine with such scales.

With the above and other objects in view my invention consists in the combination, arrangement and details of construction disclosed in the drawings and specification, and then more particularly pointed out in the appended claim.

In the drawings, wherein similar reference characters designate similar parts thruout the several views, Figure 1 is a perspective view of one form of my fish scaler showing a milling scaler therein, Figure 2 is an end elevation of a motor frame showing the driving gears for the scaler, Figure 3 is a side elevation of the milling cutter, Figure 4 is a perspective view of another form of my invention showing a flexible shaft connected to a motor located at a distance from the scaler, Figure 5 is a cross section taken thru the outer end of the fish scaler shown in Figure 4, Figure 6 is a cross section taken thru line 6—6 of Figure 4.

In the drawings, which are merely illustrative of the present invention 10 designates a suitable handle for holding the fish scaler, being operatively attached to a motor 13 around which is secured a collar 14 by means of the fasteners 15, and connected radially to the collar 14 so as to project longitudinally therefrom are the bars 17 of a semi-cylindrical frame having the end plate 19 to which is secured the bent end 18 of the bar 17. The frame is shown in Figure 1 to be open as at 20 to allow access of the milled cutter or fish scaler 21 to the scales of the fish to be scaled. The motor 13 carries a shaft 24 which projects into the frame 17—19, and fixed upon this shaft is a pinion 23 meshing with a larger gear 22 fixed so as to rotate in common with the milling cutter or scaler 21, the pintle 23ᵃ of the milling cutter 21 being revolubly mounted in a corresponding hole (not shown) formed in the motor casing. The opposite end of the milling cutter 21 may similarly have a pintle (not shown) trunnioned into the wall or plate 19 of the frame, in a manner disclosed in Figure 4 in connection with the milling cutter 31. It will now be seen that when the motor turns, the pinion 23 will drive the gear 22 thus rotating gear 22 at a fast speed; and the milling cutter when applied against a fish will engage the scales thereof and quickly remove these scales, however coarse and resisting. The flexible cord 11 passes thru the handle 10 to reach the motor and to furnish the needed current for rotating this motor.

In Figure 4 is disclosed a modification of my fish scaler wherein is shown an automatically operating fish scaler which does not carry a motor directly but is connected for rotation with a distant motor.

This construction of fish scaler embraces a handle 26 formed integrally upon a cylindrical housing 27 which is formed longitudinally with a sight opening 32 shown in Figures 4 and 6. The same form of milling cutter or scaler illustrated in Figure 3 is utilized in this construction having a pintle 29 trunnioned into the end wall 28 of the housing 27. At its opposite end the milling scaler 31 carries a flexible shaft 25 passing thru the handle 26, the flexible shaft 25 being designed to extend over to a fixed motor located at a distance from this scaler. The flexible shaft 25 is the direct means of rotation of the fish scaler 31. In operation the device is presented with the milling scaler engaging the fish scales of a fish, and the fish scales removed will fry outwardly centrifugally of the housing or casing 27. A suitable switch device 12 may be located upon the handle 10 or 26 of either type of my invention for opening and closing the electrical circuit to start and stop the rotation of the motor.

By reference to Figure 6 of the drawing, it will be observed that the milling cutter 31 is eccentrically positioned with relation to the frame 27 and that the lower portion of the milling cutter passes through the opening 32 in the frame and the edges of the cutter 31 at one side extend beyond the outer surface of the frame 27. By reason of this arrangement, the cutting edges of the milling cutter may penetrate under the scales of the fish and the exterior surface of the frame 27 may bear against the outer surfaces of the scales and prevent the cutting edges from entering too deeply into the body of the fish. Thus, the scales may be removed without cutting the skin or flesh of the fish.

From the foregoing it will be observed that I have provided two types of efficient fish scalers each characterized by the consideration that it provides a positive scaler, one that will instantly remove scales of various kinds of fish whose scales may offer varying degrees of resistance. At the same time lightness is subserved to a large extent. I do not intend to limit myself to the exact details of construction shown but claim all variations falling within the purview of the appended claim.

What I claim and seek by Letters Patent is—

A fish scaler comprising a cylindrical motor casing, a motor housed therein and having its shaft disposed concentrically thereof, a handle mounted at one end of the casing and centrally aligned therewith, a conductor threaded longitudinally through the handle and adapted to supply current to the motor, a frame mounted at the other end of the casing and provided at its side with an opening, a milling cutter journaled in the frame at a point between the opening thereof and the center of the motor casing, intermeshing gear wheels operatively connecting the shafts of the motor and the cutter together, said milling cutter having a peripheral portion disposed through the opening in the frame and having milling edges at one side disposed beyond the exterior surface of the frame.

In witness whereof he has hereunto set his hand this sixteenth day of March, 1926.

WILLIAM REILLY.